(12) United States Patent
Popovich

(10) Patent No.: US 6,489,990 B1
(45) Date of Patent: Dec. 3, 2002

(54) HIGHLIGHT COMPENSATION APPARATUS FOR MONOCHROME CAMERAS

(75) Inventor: Michael Charles Popovich, Lancaster County, PA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1093 days.

(21) Appl. No.: 08/565,700

(22) Filed: Nov. 30, 1995

(51) Int. Cl.[7] .................................................. H04N 5/20
(52) U.S. Cl. ......................................... 348/255; 348/364
(58) Field of Search ................................ 348/222, 229, 348/230, 254, 255, 364; 358/518; H04N 5/20

(56) References Cited

U.S. PATENT DOCUMENTS 5,293,238 A * 3/1994 Nakamo et al. ............. 348/226
5,339,163 A * 8/1994 Homma et al. .............. 348/229
5,473,374 A * 12/1995 Shimizu et al. ............. 348/363
5,616,970 A * 4/1997 Dittrich ....................... 327/165

* cited by examiner

Primary Examiner—Tuan Ho
(74) Attorney, Agent, or Firm—Michael E. Belk

(57) ABSTRACT

A monochrome camera system, includes a processor for producing an image signal, a first circuit for selectively adjusting an overall gain of the image signal produced by the processor, and a second circuit, coupled to the processor. The second circuit selectively adjusts a gain of a portion of the image signal within a predefined region of a field of the image without affecting an overall gain set by the first circuit of other portions of the image field.

20 Claims, 9 Drawing Sheets

HIGHLIGHT COMPENSATION APPARATUS FOR MONOCHROME CAMERAS

BACKGROUND OF THE INVENTION

1. Field of the Invention

The present invention generally relates to a monochrome camera and more particularly to an apparatus for providing highlight compensation for monochrome cameras such that white-wash is minimized in an image formed in an image display region.

2. Description of the Related Art

Conventional monochrome (e.g., black-and-white (B/W)) cameras typically include a B/W chip set. However, such a chip set does not typically include any backlight compensation circuitry. This presents a problem when the camera views a backlight scene with images in a dimly lit foreground since such images do not appear on the output video with sharp, or clear details.

Another problem is that, even in a color camera having an automatic gain circuit (AGC) having a backlight compensation circuit therein, normal backlight compensation averages more heavily a window region in a video screen. This type of averaging causes increased video gain even if a strong light source is present outside the window. Specifically, in color cameras, backlight compensation is a feature of a conventional AGC and as mentioned above is found therein. A window (WND) pulse from a sync generator, defines a predetermined (e..g, square center) region of interest.

When this WND pulse is fed to the AGC, the AGC weighs the center region more heavily than the surrounding region. Thus, the AGC averages the window region to determine its operating point rather than the entire field-of-view. However, as the gain increases across the video screen, the light source white-washes the video image around its region. This is a problem if the viewer is observing important images around the light source. Thus, viewing is made difficult.

Thus, conventional monochrome cameras use a single chip processor to produce a monochrome video signal and hitherto the invention, such processors lacked the backlight compensation circuitry even found in a color camera.

Further, prior to the invention, the color camera's AGC suffered from the above-mentioned problem of white-wash.

SUMMARY OF THE INVENTION

It is therefore an object of the present invention to provide a monochrome camera, such as a black-and-white (B/W) camera, with a capability of producing B/W backlight compensation.

Another object is to provide a highlight compensation circuit in which the above-mentioned problem of white-wash is overcome.

In a first aspect of the present invention, a monochrome camera is provided with a highlight compensation mechanism in which an external circuit has been added to a conventional single-chip processor, to develop backlight compensation. Unlike the backlight compensation feature found in conventional color camera chip sets, in the invention highlight compensation is external to an automatic gain circuit (AGC) averaging loop. The advantage of having this circuit outside the AGC is that it prevents white-wash in the video image.

Specifically, as mentioned above, normal backlight compensation averages more heavily a window region in the video screen. This type of averaging causes the video gain to increase even if a strong light source is present outside the window. As the gain increases across the video screen, the light source washes white the video image in its region. This does not occur in the present invention including the highlight compensation mechanism since such a mechanism only increases the gain within the window region. Thus, with the present invention, a monochrome camera is provided which reliably produces monochrome backlight compensation.

Further, there is no white-wash encountered in the image formed in the region of the display. Specifically, the white-wash problem encountered with backlight compensation may be eliminated by using the highlight compensation feature of the present invention.

Another advantage of the highlight compensation feature is that it can be applied to any region within the video field without compromising the averaging process of the AGC. The highlight compensation region may be advantageously made to have any size, and the magnitude of the gain within the region may be advantageously set by the highlight compensation circuit.

BRIEF DESCRIPTION OF THE DRAWINGS

The foregoing and other objects, aspects and advantages will be better understood from the following detailed description of preferred embodiments of the invention with reference to the drawings, in which:

FIG. 7B is a graph illustrating a video signal with typical backlight compensation being turned on.

DETAILED DESCRIPTION OF PREFERRED EMBODIMENTS OF THE INVENTION

Figure 1:
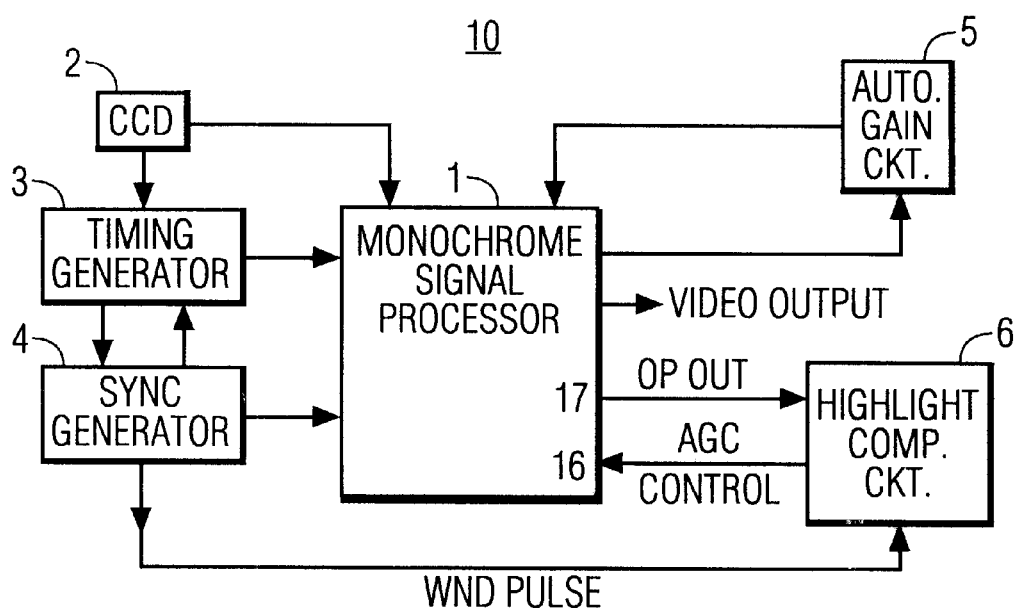
FIG. 1 is a block diagram of a monochrome camera system 1 including a highlight compensation circuit 6 according to the present invention.

Referring now to the drawings, and more particularly to FIG. 1, there is shown a monochrome (e.g., black-and-white) camera having a backlight compensation feature.

Generally, as mentioned above, monochrome cameras use a single chip processor to produce a monochrome video signal.

However, in the invention, to develop backlight compensation, external circuits were added to the above-mentioned conventional single-chip processor. The present inventor found that, while testing with these external circuits, these circuits could be advantageously used as a highlight compensation device which enhances images in a dimly lit foreground.

Turning to FIG. 1, a monochrome (black-and-white) camera 10 includes a monochrome signal processor 1 which is preferably an analog signal processor. For example, a signal processor produced by Sony Corporation under Model No. CXA-1310A could be used. However, other monochrome signal processors can also be advantageously used according to the designer's constraints and requirements.

Signal processor 1 is connected to receive an electrical image input signal from a charge coupled device (CCD) 2. The CCD 2 is a photosensitive device which produces an electrical signal of the light incident to an imager array within the CCD. The CCD is believed to be well known to one of ordinary skill in the art and, for brevity, will not be discussed here in detail.

A timing generator 3 also provides an input to the monochrome signal processor 2, as well as to the CCD 2, so as to time the electrical signal image of the CCD and the input of the CCD image to the processor 1. The timing generator is also believed to be well known to one of ordinary skill in the art and, for brevity, also will not be discussed here in detail.

A sync generator 4 provides an input to the processor 1 as well as to the timing generator 3 for synchronizing the timing and electrical image input signals. The sync generator 4 also receives an input from the timing generator 3. Thus, the timing signals for coordinating the signal output by the CCD with the video signal processor's integrated circuit (IC) are provided by the timing and sync generators 3, 4.

The sync generator 4 is also believed to be well known to one of ordinary skill in the art and, for brevity, will not be discussed in detail. Briefly, the sync generator 4 may be a sync generator produced by Sony Corporation under the Model No. CXD1159Q, or other like sync generator. Further, as discussed in detail below, the sync generator may be advantageously utilized to generate a window (WND) pulse. This window pulse (WND) turns on a transistor circuit which controls a resistor divider network at the collector, discussed in further detail below.

Figure 3:
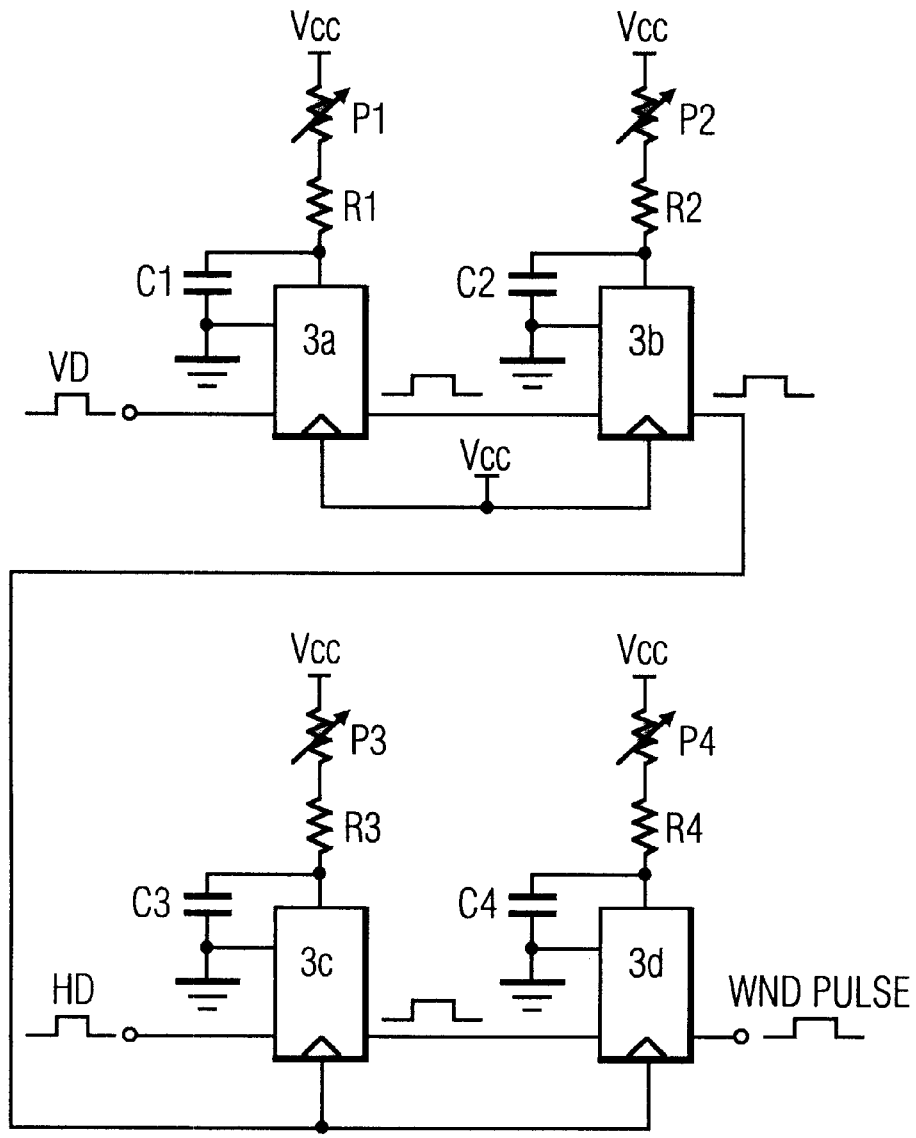
FIG. 3 is a schematic diagram of a multivibrator circuit for producing a WND pulse used by the highlight compensation circuit 6 according to the present invention.

However, while the sync generator 4 of FIG. 1 is shown as generating the WND pulses, the WND pulses may alternatively generated by a timing circuit using multivibrators (as shown in FIG. 3), or by a microcomputer. For example, a timing circuit using a plurality of 4538 monostable multivibrators (see, for example, multivibrators 3a–3d of FIG. 3), was designed which produces an adjustable window which can be made into any size and moved to any position on the video screen.

An automatic gain circuit (AGC) 5 receives an output from the processor 1 and also provides an automatic gain signal to the processor 1. The signal processor 1 uses the AGC 5 to determine the amount of light the CCD imager is receiving, and to generate a control voltage which sets the gain of an internal amplifier (not illustrated) which amplifies the video output signal. Further, the AGC 5 typically includes the backlight compensation circuit described above.

A highlight compensation circuit 6 receives an OP OUT output signal from the signal processor 1 (e.g., in an exemplary configuration, from a terminal 17 of signal processor 1) and inputs an AGC CONT control signal to the signal processor 1 (e.g., in the exemplary configuration, to a terminal 16 of the signal processor 1). The highlight compensation circuit 6 also receives the window (WND) pulse from the sync generator 4. As shown, the highlight compensation circuit 6 is separate from the AGC loop.

Based on the above inputs, the signal processor 1 issues a video output signal to a display (not illustrated), an output device or the like.

Prior to describing in detail the highlight compensation circuit 6 according to the invention, it is noted that, unlike the backlight compensation feature found in the conventional color camera chip sets, the inventive highlight compensation circuit 6 is advantageously positioned outside the AGC averaging loop. Such positioning of the circuit 6 outside the AGC 5 prevents white-wash in the video.

Figure 2:
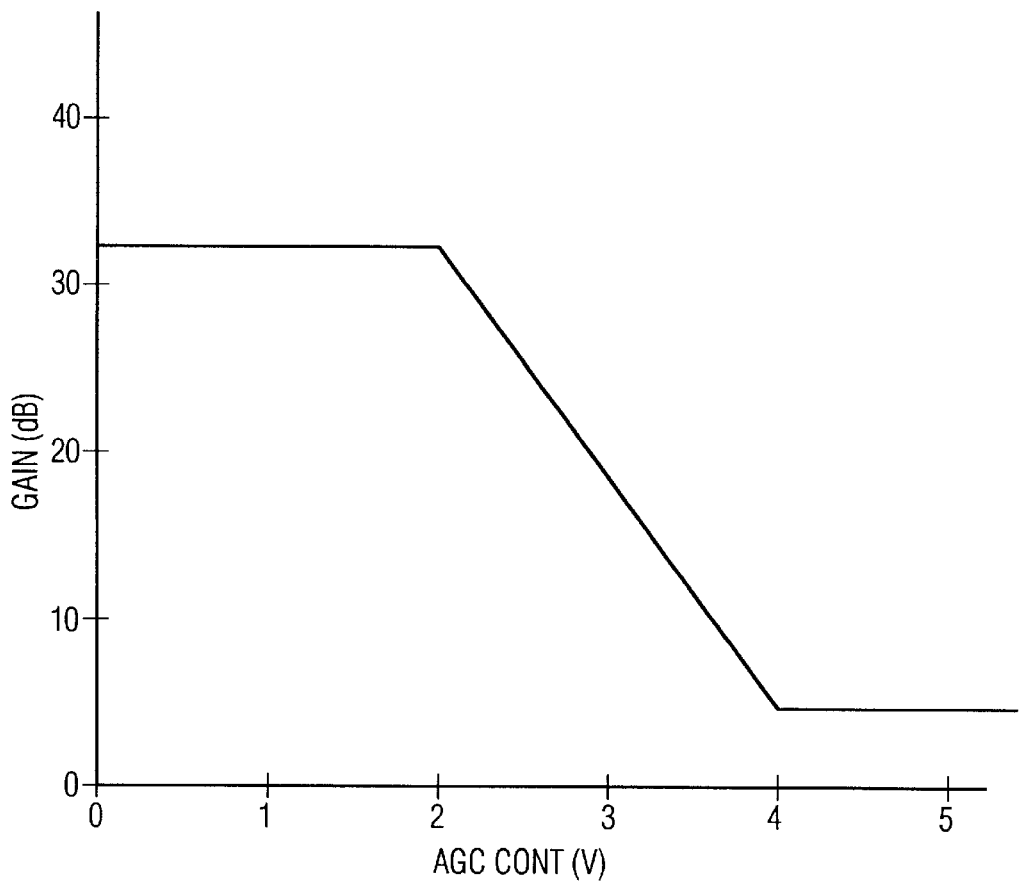
FIG. 2 illustrates a gain control characteristic of an automatic gain circuit (AGC) 5 of the monochrome camera system 1 shown in FIG. 1.

More specifically, normal backlight compensation averages more heavily a window region in the video. This type of averaging causes the video gain to increase even if a strong light source is present outside the window. As the gain increases across the video screen, the light source washes white the video in its region. This does not occur with the highlight compensation feature according to the present invention since the circuit only increases the gain within the window. A preferred AGC control characteristic curve is shown in FIG. 2.

Before turning to the details of the highlight compensation circuit 6, it is noted that monochrome cameras typically employ a single chip processor which produces a monochrome video signal. However, such processors normally lack backlight circuitry found, for example, in a color camera's AGC. Thus, backlight compensation must be provided in such monochrome cameras.

As one structure, a camera was provided in which a sync/timing generator of the camera was included, but in which the sync/timing generator produced no WND pulse. In this case, a WND pulse must be produced by means other than the sync/timing generator.

For example, as shown in FIG. 3, the structure issues vertical/horizontal outputs and these output signals are used in a multivibrator design for producing a WND pulse.

The multivibrators 3a–3d were designed into one-shot pulse signal generators that trigger on the edge of the input signal. The duration of the one-shot pulse is controlled by the time constant of an external resistor and capacitor arrangement connected to each multivibrator. Values of such components can be suitably designed according to the designer's requirements.

A first multivibrator 3a will trigger on the falling edge of the vertical drive (VD) signal. Typically, in National Television Standards Committee (NTSC) cameras, the VD signal is a 59.94 Hz pulse which occurs at the top of each video field. The pulse generated by the multivibrator 3a defines the vertical position of the highlight region from the top of the video field. This position may be suitably adjusted by the designer using components P1, R1 and C1.

A second multivibrator 3b will trigger on the falling edge of the first multivibrator pulse. The pulse created by the second multivibrator defines the vertical height of the highlight region and this height may be suitably adjusted by the designer using components P2, R2, and C2. The pulse from multivibrator 3b enables another pair of multivibrators 3c, 3d.

The first multivibrator 3c of the second pair of multivibrators will trigger on the falling edge of the horizontal drive (HD) signal. Typically in NTSC cameras, the HD signal is a 15.734 kHz pulse which occurs at the beginning of each horizontal video line. The pulse generated by multivibrator 3c defines the horizontal position of the highlight region from the left of the video field. This position may be adjusted by the designer using components P3, R3, and C3.

The second multivibrator 3d will trigger on the falling edge of the first multivibrator pulse 3c. The pulse created by the second multivibrator 3d defines the horizontal width of the highlight region, and this width may be adjusted by the designer using components P4, R4, and C4. Thus, the pulse from the multivibrator 3d simulates the WND pulse produced in a color camera's sync generator. As mentioned above, the WND pulse also may be produced by other circuitry such as a timing circuit, a microprocessor, or the like.

Figure 4:
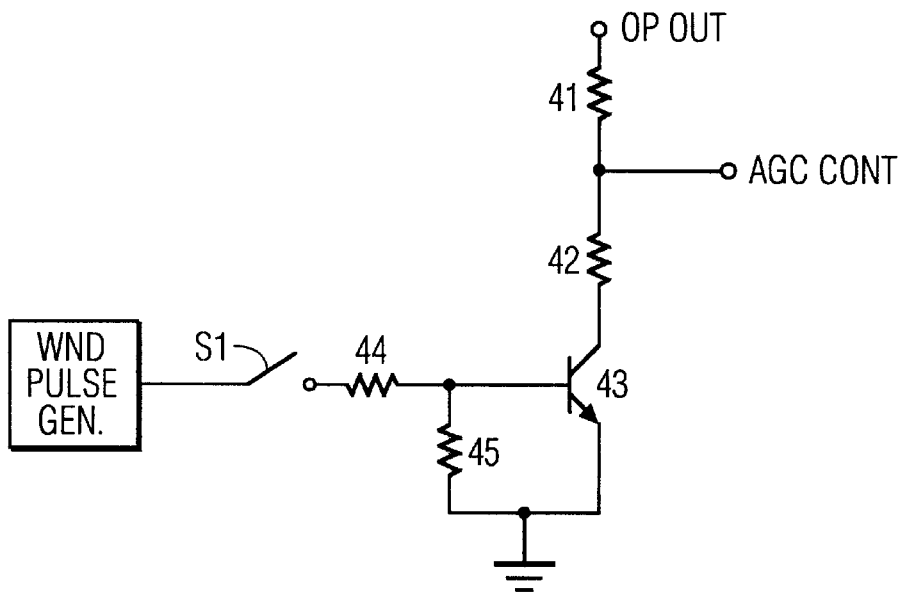
FIG. 4 illustrates a first embodiment of the highlight compensation circuit 6 according to the present invention.

Turning now to the highlight compensation circuit 6 according to the present invention, a preferred circuitry of the highlight compensation circuit 6 is shown in FIG. 4. This circuit is positioned between the AGC operation amplifier output and the AGC control voltage input.

Figure 5:
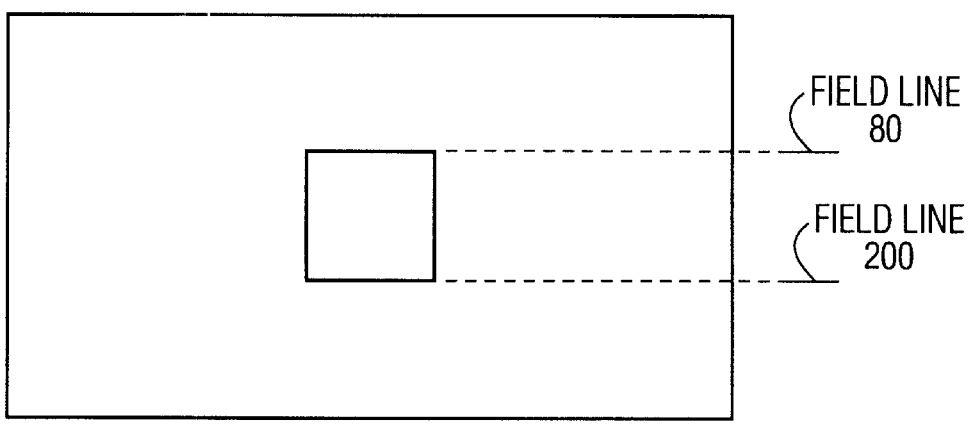
FIG. 5 illustrates a predetermined (e.g., square center) region on a video screen.

As shown in FIG. 4, an automatic gain circuit control signal is received at a terminal or terminal pin (e.g., in the exemplary configuration, at terminal pin 16) of the signal processor. A resistor divider network including resistors 41 and 42 is provided for attenuating the control signal when a switching transistor 43 is turned ON. When enabled by the closing switch S1, the transistor 43 is switched ON and OFF by a pulse such as the WND pulse shown in FIG. 1. The WND pulse is a signal produced by a WND pulse generator. In the case of FIG. 1, the WND pulse signal is produced by the sync generator 4. The WND pulse defines a square region in the center of the video field. This region is shown in FIG. 5. Of course, the region may have any shape as determined and suitably designed by the designer, and may be adjustable such that different video field lines may be selected by the operator for highlight compensation. For exemplary purposes, video field lines 80 and 200 are shown in FIG. 5.

Resistor values for resistors 44 and 45 may be selectively designed to switch the transistor into full saturation when the WND pulse is applied to the base of the transistor 43. For example, the resistance of resistor 44 and that of resistor 45 may be 1 kΩ, respectively.

As mentioned above, the WND pulse may be generated from a source other than the sync generator 4. For example, it could be generated by a microprocessor, a timing circuit or a circuit including a number of retriggerable, one-shot multivibrators 3a–3d, such as that shown in FIG. 3.

Further, while the center region has been described above as the region of interest, the region may be moved into different locations on the video field other than the center region described above. Thus, different video field lines may be suitably selected by the operator.

When the pulse turns on the transistor 43, the AGC control signal decreases in amplitude depending upon the design of the resistor divider network.

For example, if the AGC 5 sets the AGC control voltage to 4V, the divider network may include a resistor 41 having a value of substantially 10 kΩ and a resistor 42 having a resistance value of substantially 39 kΩ. This structure decreases the AGC control voltage to approximately 3.2 V, which increases the AGC gain by 10 dB according to the characteristic curve shown in FIG. 2. As a result, there is an increase in the video output signal within the region defined by the WND pulse, and as a result there is no white-wash of video images around or near strong light sources as in the conventional systems.

In operation, an object enters the center of the video field with a brightly lit background. Normally, the AGC 5, via a signal from signal processor 1, determines whether the light level is at a high level (such as 200 ft.-lamberts or other values as suitably determined according to the designer's constraints and requirements). If the light level is "high", then the gain of the amplifier (not illustrated) of the AGC 5 is decreased (e.g., by 10 dB) by the signal processor 1. Such a decrease in gain causes the object in the center of the video field to become a darkened silhouette without any visible details.

The highlight compensation circuit 6 according to the present invention is turned ON by gating the WND pulse into the transistor 44 via gate S1 and resistor 44, which causes the video in the defined center region to be amplified, thereby illustrating more details in the center region to the viewer.

As mentioned above, the window (WND) pulse can be generated using a sync generator, a timing circuit using multivibrators, or by a microcomputer, so long as an adjustable window is made possible such that the window can be selectively formed to have any size and moved to any position on the video screen. The WND pulse turns on a transistor circuit which controls a resistor divider network at the collector.

Thus, with the structure of the invention, an image can be seen more clearly and white-wash is minimized, if not actually prevented.

Figure 6:
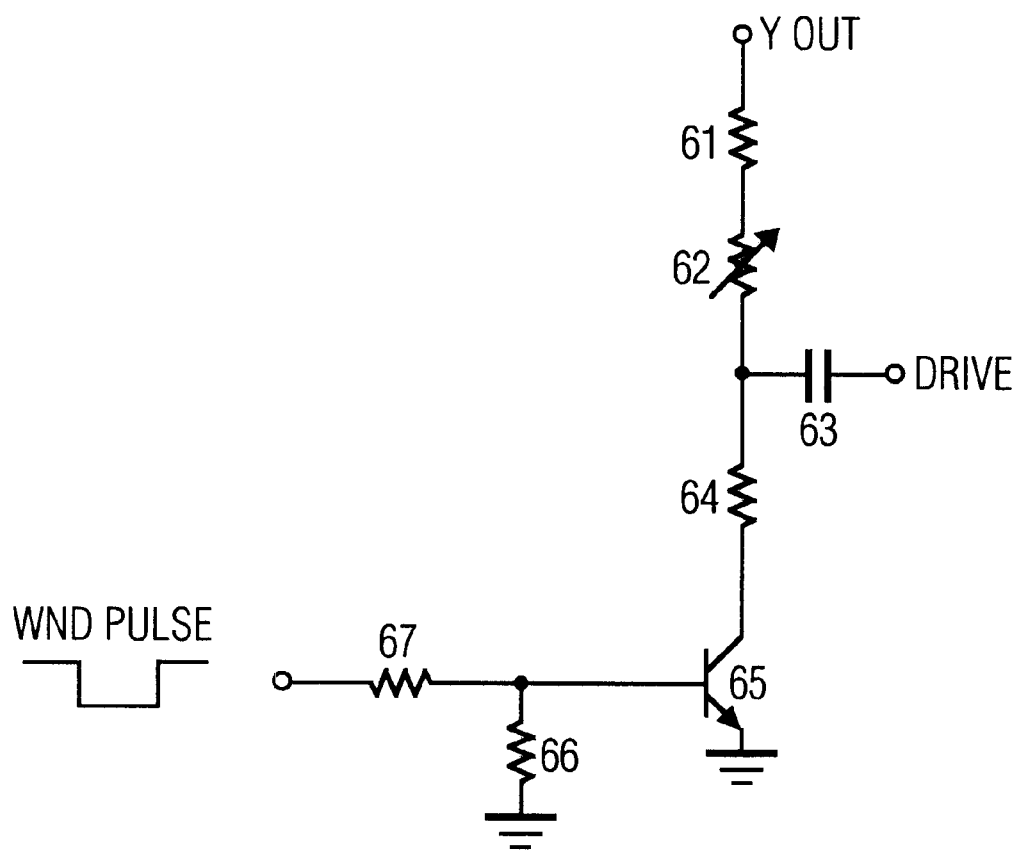
FIG. 6 illustrates a second embodiment of the highlight compensation circuit according to the present invention.

A second embodiment of the highlight compensation circuit is shown in FIG. 6 and is for attenuating the signal region outside the window. This circuit attenuates, for example, the signal between the Y OUT and the DRIVER IN pins (e.g., terminal pin 8 and terminal pin 7) of the signal processor 1. The amount of attenuation is controlled by a potentiometer 62. Adjusting the potentiometer 62 causes the video in the window to increase in luminance as compared to the region outside the window. The potentiometer 62 may have a value of 10 kΩ, whereas a capacitor 63 may have a value of 0.1 $\mu$F. Resistors 61 and 64 each may have a value of 10 kΩ, whereas resistors 66 and 67 may have a value of 1 kΩ each. Of course, each of these values may be suitably adjusted by the designer according to the designer's objectives.

In the second embodiment, as shown in FIG. 6, an external circuit is introduced to the signal processor at the input to the DRIVER IN. Normally, the emitter follower from Y OUT is coupled to the capacitor 63 (e.g., of about 0.1 $\mu$F) and inputted to the DRIVER IN terminal.

According to this aspect of the invention, the WND pulse (generated for example by multivibrator 3d in FIG. 3 or another WND pulse generating source) is used for turning ON or OFF an attenuation circuit between Y OUT and DRIVER IN, as shown in FIG. 6. This circuit attenuates the region outside the WND pulse. The amount of attenuation is controlled by the potentiometer 62 (for example, a 10 kΩ potentiometer may be provided) which causes a highlighted window to appear on the screen.

Thus, this structure enhances images in a dimly lit foreground and as discussed above, a key advantage of this structure is that it is outside the AGC averaging loop. If there is a strong light source in the background, the AGC 5 is still able to average in the source and compensate the gain to prevent whitewash. This does not occur in the backlight feature of color cameras since the AGC averages more heavily in the window than the outside region.

However, a drawback of the second embodiment is that it may place the video signal outside of the National Television Standards Committee (NTSC) standard since the circuit of the second embodiment of the invention is attenuating between the Y-circuitry and the clipping circuitry of the signal processor 1.

Such a drawback of placing the signal outside of the NTSC standard is not encountered in the first embodiment of the highlight compensation circuit described above. As noted above, the first embodiment attenuates the signal between the OP OUT (e.g., pin 17) pin and the AGC CONT pin (e.g., pin 16) of the signal processor 1. This circuit attenuates within the window region the DC signal causing the gain in the amplifier to increase. The amount of attenuation is controlled by a potentiometer. Adjusting the potentiometer causes the video in the window to increase in luminance as compared to the region outside the window.

Thus, in comparison to the second design, the first embodiment introduces highlight compensation by adding an attenuation circuit, similar to the design of the second embodiment, but such an attenuation circuit is added to the AGC CONT and OP OUT pins.

The effect of introducing the circuit of the first embodiment to the AGC loop is similar to the second design when an attenuation circuit was added to the DRIVER IN input. This circuit (e.g., the first embodiment) does not affect the image processing like the second design, but instead the first embodiment lowers the DC voltage from OP OUT within the WND pulse. This causes the gain in the AGC to increase and highlights the video inside the window.

For purposes of comparison, several exemplary measurements of gain by the highlight compensation circuits described above were conducted and the results are discussed below.

Figure 7A:
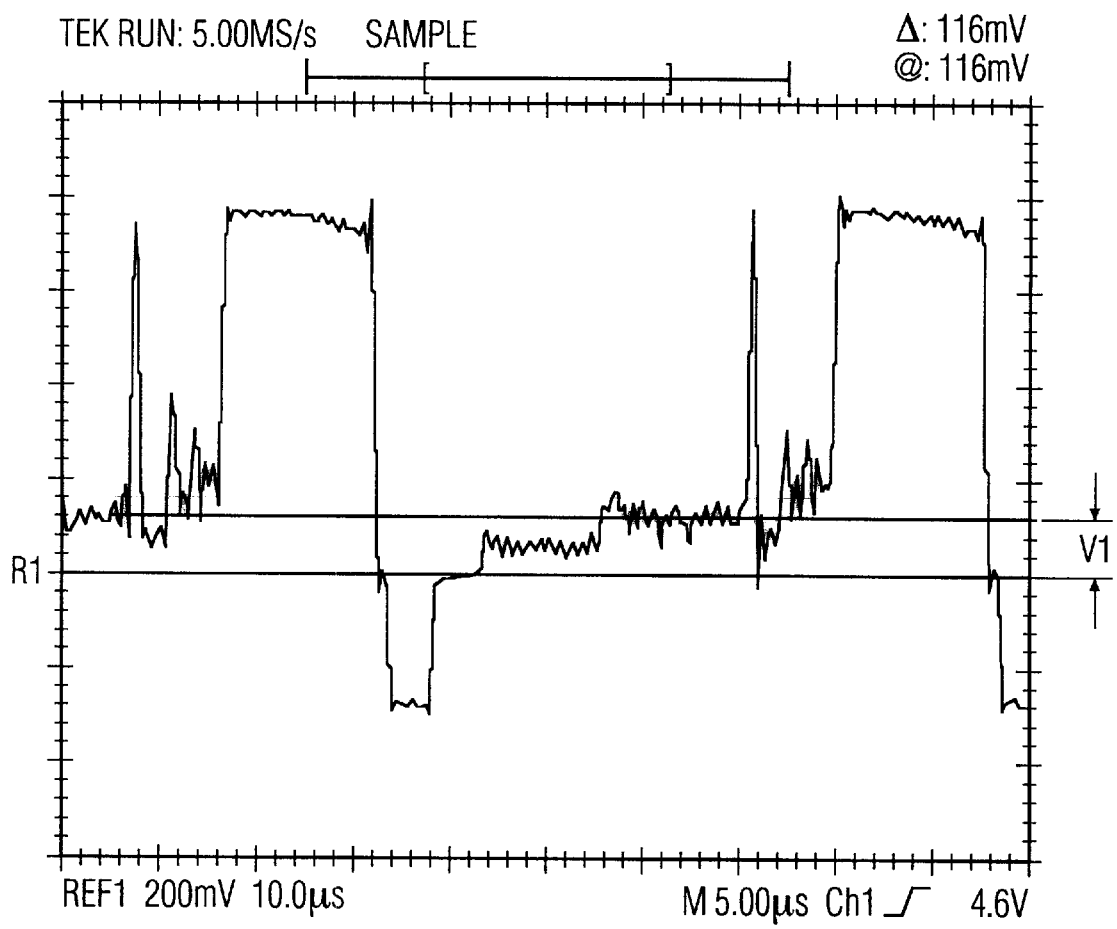
FIG. 7A is a graph illustrating a video signal with the backlight compensation being turned off.

First, with regard to the circuit for measuring backlight compensation, the amount of gain this circuit adds to the video signal was measured at two different 1 K potentiometer settings. FIG. 7A shows the video signal with the backlight compensation OFF.

Figure 7B:
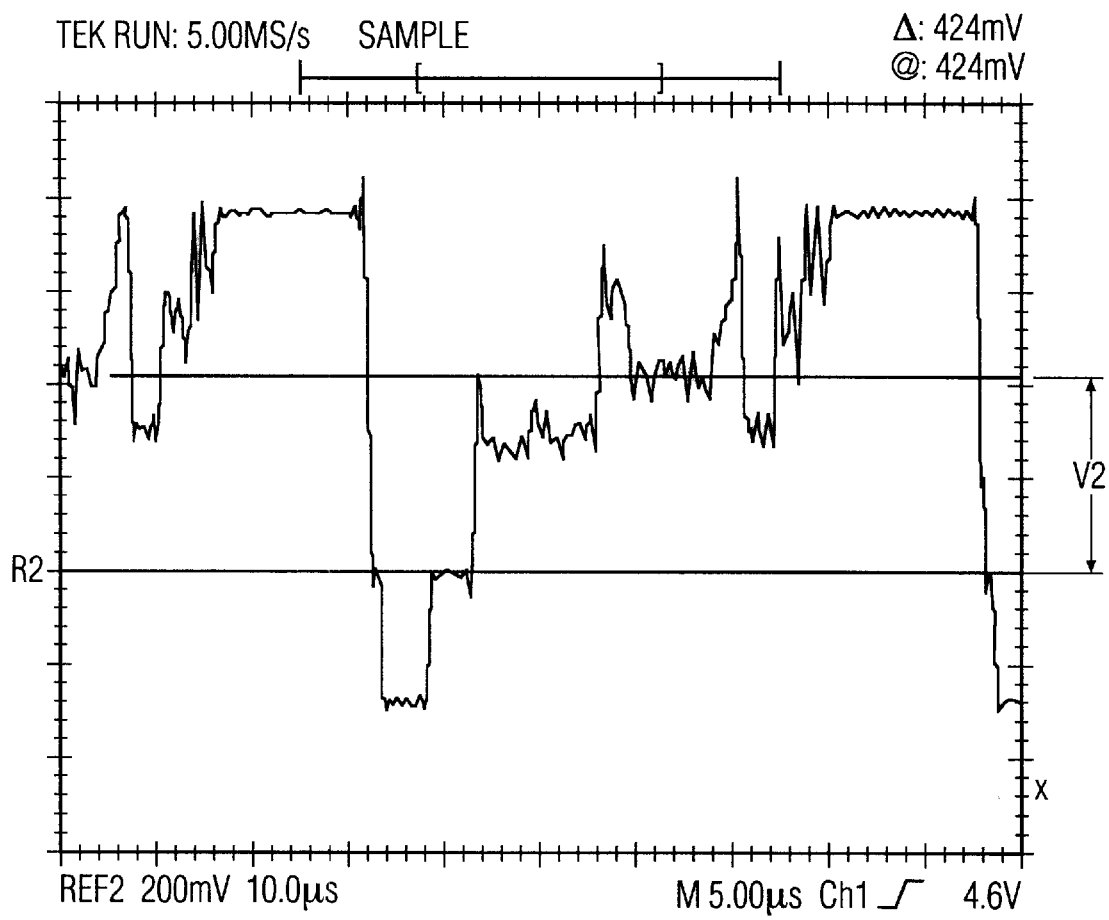

FIG. 7B illustrates the video signal with typical backlight compensation ON. The gain can be calculated by using the equation:

$$\text{GAIN} = 20 \log(V2/V1) \quad (1)$$

Letting V2=424 mV and V1=116 mV, the gain using equation (1) is:

$$\text{GAIN} = 20 \log(424/116) = 11.2582 \text{ dB} \approx 11 \text{ dB}$$

The first circuit design, as shown in FIG. 4, advantageously provides highlight compensation. As previously mentioned, this circuit increases the gain within a window, and highlights the video within that window. Two measurements of the video gain using the highlight compensation circuit were taken at different 10 K potentiometer settings placed at resistor location 41 and a 10 kΩ resistor placed at resistor location 42 of FIG. 4.

Figure 8A:
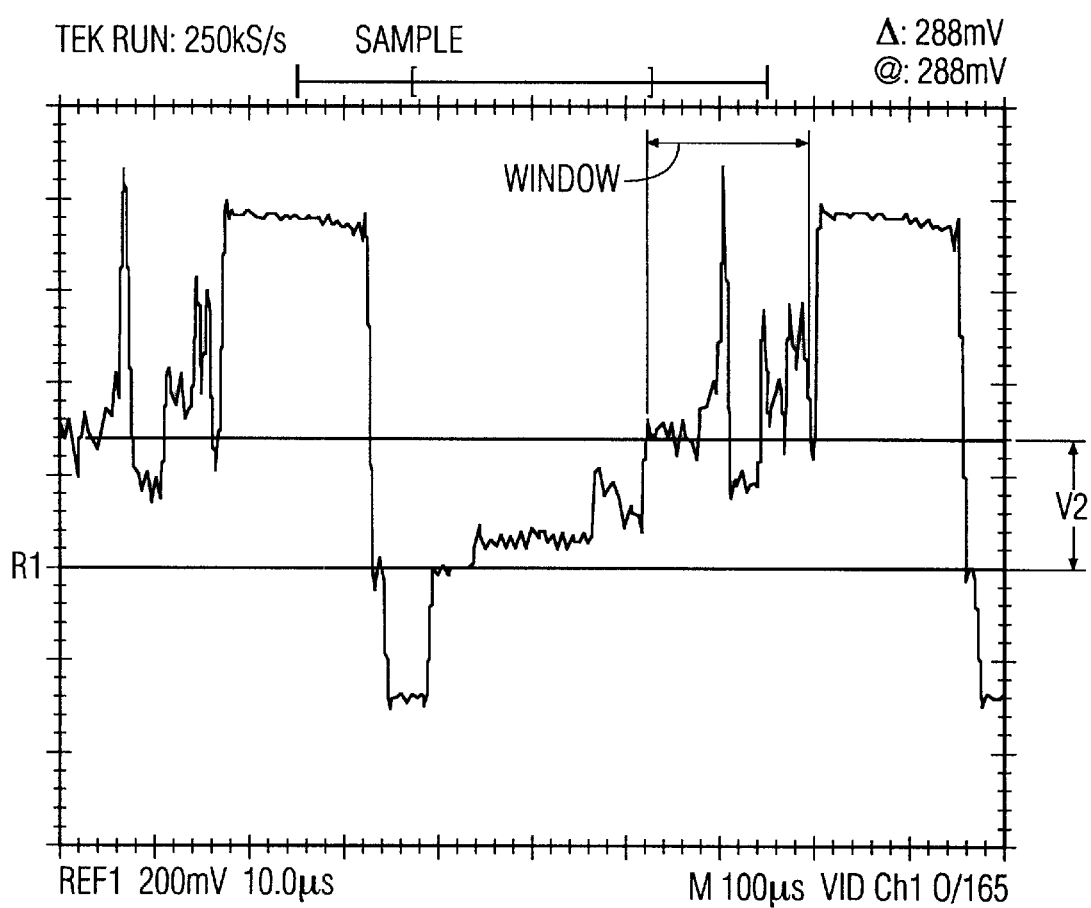
FIG. 8A is a graph illustrating a video signal with the highlight compensation being turned on and a resistance of 3.3 kΩ.

FIG. 8A shows the video signal with highlight compensation ON, and the 10 K potentiometer set at R=3.3 kΩ. Letting V2=288 mV and V1=116 mV, the gain using equation (1) is:

$$\text{GAIN} = 20 \log(288/116) = 7.8987 \text{ dB} \approx 7.9 \text{ dB}$$

This is the gain which occurs in the window shown in FIG. 8A.

Figure 8B:
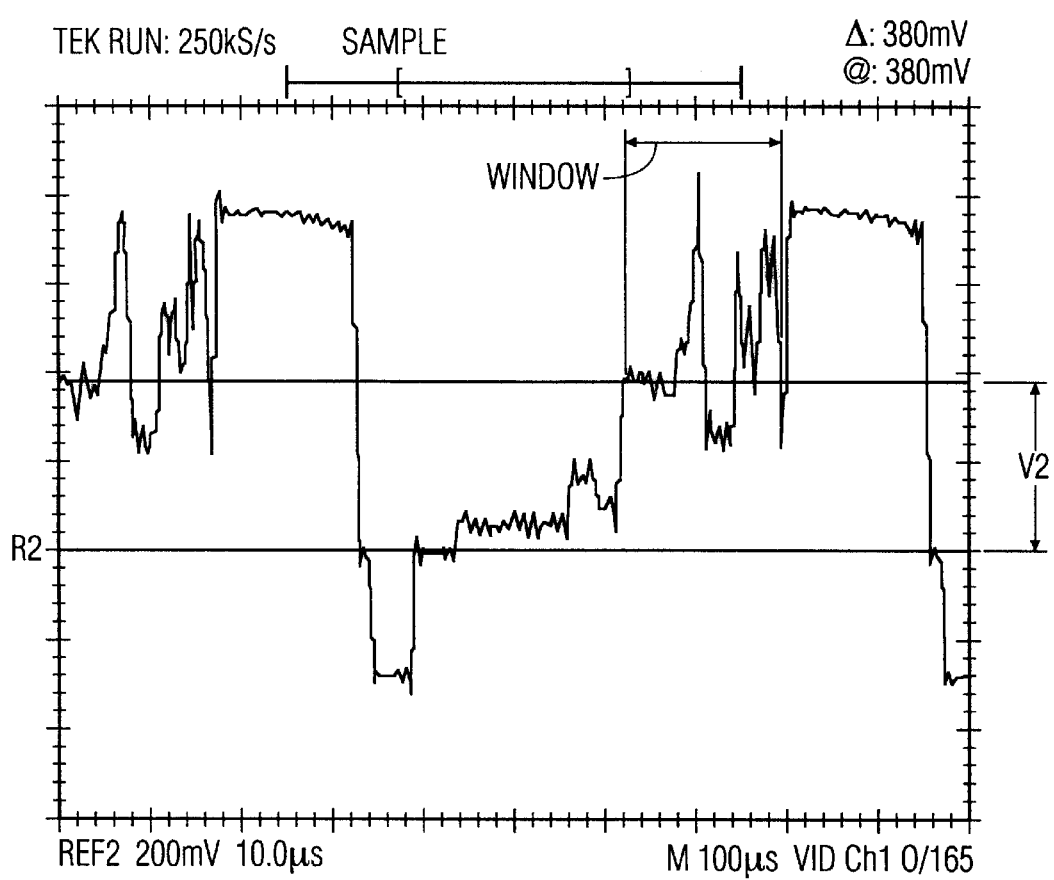
FIG. 8B is a graph illustrating a video signal with the highlight compensation being turned on and a resistance of 4.88 kΩ.

FIG. 8B shows the video signal with highlight compensation ON, and the 10 K potentiometer set at R=4.88 kΩ. Letting V2=380 mV and V1=116 mV, the gain using equation (1) is:

$$\text{GAIN} = 20 \log(380/116) = 10.3065 \text{ dB} \approx 10 \text{ dB}$$

This is the gain which occurs in the window shown in FIG. 8B.

Thus, testing with these external circuits indicates that these circuits can be advantageously used as a highlight compensation device which enhances images in a dimly lit foreground. Additionally, the highlight compensation circuit can be incorporated into the monochrome camera to overcome the above-mentioned problem of white-wash.

Furthermore, according to the present invention, a monochrome camera can be provided which includes a mechanism for producing monochrome backlight compensation.

While the invention has been described in terms of several preferred embodiments, those skilled in the art will recognize that the invention can be practiced with modification within the spirit and scope of the appended claims.

For example, in lieu of using a potentiometer, a fixed resistor may be used in place thereof.

What is claimed is:

1. A monochrome camera system, comprising:
   processor means for producing an image signal;
   first circuit means for selectively adjusting an overall gain of the image signal produced by the processor; and
   second circuit means, coupled to the processor means, for selectively adjusting a gain of a portion of the image signal within a predefined region of an image field, without affecting the overall gain set by the first circuit means of other portions of the image signal.

2. The system of claim 1, further comprising means, coupled to the processor means and to the second circuit means, for generating a window (WND) pulse;
   the second circuit means receiving the WND pulse for selectively adjusting the gain of the portion of the image signal within the predefined region.

3. The system of claim 2, wherein the second circuit means includes a highlight compensation circuit means, including:
   transistor switching network means including first and second resistors and a transistor coupled thereto, for the transistor to be selectively turned on by the WND pulse to issue a signal to the processor means for controlling the first circuit means.

4. The system of claim 2, wherein the WND pulse defines the predefined region.

5. The system of claim 3, further comprising resistor divider network means including first and second resistors for attenuating a signal for controlling the first circuit means, when the switching transistor is turned on.

6. The system of claim 3, wherein values of the first and second resistors of the transistor switching network means are for setting such that the transistor is in full saturation when the WND pulse is applied to the transistor.

7. The system of claim 2, further comprising means for moving the predefined region from a first position to a second position within the image field,
   the moving means including means for controlling the WND pulse and means for selectively adjusting a size and shape of the predefined region.

8. The system of claim 1, wherein the second circuit means includes transistor switching network means including first and second resistors and a transistor coupled thereto, for selectively adjusting a gain within the region by setting, to a predetermined value, a ratio of a resistance of the first resistor of the transistor switching network means to that of the second resistor of the transistor switching network means.

9. The system of claim 3, wherein the highlight compensation circuit means is for selective actuation by the WND pulse.

10. The system of claim 8, wherein the first and second resistors include at least one of fixed resistors and variable resistors.

11. The system of claim 2, wherein the WND pulse generating means includes one of a sync generator and a plurality of multivibrators.

12. The system of claim 11, wherein each of the plurality of multivibrators respectively include coupled thereto a resistor and a capacitor network.

13. The system of claim 1, wherein the first circuit means include an automatic gain circuit (AGC) including means for providing backlight compensation for the image signal.

14. The system of claim 1, wherein the second circuit means is provided separately from a processing loop of the first circuit means.

15. The system of claim 3, wherein the highlight compensation circuit means further includes a capacitor coupled to the first and second resistors, and wherein the first resistor includes a variable resistor.

16. A highlight compensation circuit for a monochrome camera including processor means for producing an image signal and a circuit for selectively adjusting an overall gain of the image signal produced by the processor means, the highlight compensation circuit comprising:

transistor switching network means, coupled to the processor means, including first and second resistors, and a transistor coupled thereto, for selectively adjusting a gain of a portion of the image signal within a predefined region of an image field, without affecting the overall gain set by the circuit of other portions of the image signal.

17. The circuit of claim 16, further comprising a resistor divider network including first and second resistors for attenuating a signal for controlling the first circuit means, when the switching transistor is turned on by an external pulse.

18. A camera, comprising:

processor means for producing an image signal;

automatic gain circuit means for selectively adjusting an overall gain of the image signal produced by the processor means; and highlight compensation circuit means, coupled to the processor means, for selectively adjusting a gain of only a portion of the image signal within a region of an image field.

19. The camera of claim 18, further comprising means for determining a characteristic of the image signal outside of the region of the image fields;

wherein the highlight compensation circuit means is for adjusting the gain of the portion of the image signal within the region of the image field based on an output of the means for determining; and wherein the highlight compensation circuit means is for adjusting the again of the region without affecting the overall gain of the image signal outside of the region, set by the automatic gain circuit.

20. The camera of claim 19, wherein the highlight compensation circuit means includes:

transistor switching network means including first and second resistors and a transistor coupled thereto, wherein the transistor is selectively turned on by the means for determining to thereby issue a signal to the processor means, for controlling the automatic gain circuit; and resistor divider network means including first and second resistors, for attenuating a signal for controlling the automatic gain circuit, when the transistor is turned on.

* * * * *